United States Patent
VanBlon et al.

(10) Patent No.: US 11,212,330 B2
(45) Date of Patent: Dec. 28, 2021

(54) CASTING CONTENT BASED ON DEVICE CAPABILITIES

(71) Applicant: LENOVO (Singapore) PTE. LTD., New Tech Park (SG)

(72) Inventors: Russell Speight VanBlon, Raleigh, NC (US); Aaron M. Stewart, Raleigh, NC (US); Joshua N. Novak, Wake Forest, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/783,698

(22) Filed: Feb. 6, 2020

(65) Prior Publication Data
US 2021/0250395 A1    Aug. 12, 2021

(51) Int. Cl.
*G06F 16/435*   (2019.01)
*G06F 16/9535*  (2019.01)
*H04L 29/06*    (2006.01)
*H04L 12/911*   (2013.01)

(52) U.S. Cl.
CPC ............ *H04L 65/60* (2013.01); *G06F 16/435* (2019.01); *G06F 16/9535* (2019.01); *H04L 47/82* (2013.01)

(58) Field of Classification Search
CPC ....... H04L 65/60; H04L 47/82; G06F 16/435; G06F 16/9535
See application file for complete search history.

(56) References Cited

U.S. PATENT DOCUMENTS

| | | | | |
|---|---|---|---|---|
| 10,321,182 | B2* | 6/2019 | Herz | H04N 21/44218 |
| 2010/0315549 | A1* | 12/2010 | Basso | H04N 21/44218 |
| | | | | 348/445 |
| 2011/0214059 | A1* | 9/2011 | King | H04L 43/0882 |
| | | | | 715/735 |
| 2011/0283334 | A1* | 11/2011 | Choi | H04L 67/148 |
| | | | | 725/148 |
| 2014/0006496 | A1* | 1/2014 | Dearman | H04L 67/16 |
| | | | | 709/204 |
| 2014/0059231 | A1* | 2/2014 | Choi | H04M 1/72469 |
| | | | | 709/226 |
| 2014/0213227 | A1* | 7/2014 | Rao | H04W 4/21 |
| | | | | 455/414.3 |
| 2015/0067054 | A1* | 3/2015 | Yoo | H04L 65/4092 |
| | | | | 709/204 |
| 2016/0173937 | A1* | 6/2016 | Shih | H04N 21/436 |
| | | | | 725/37 |
| 2016/0255121 | A1* | 9/2016 | McRae | H04L 12/4625 |
| | | | | 709/205 |
| 2016/0259616 | A1* | 9/2016 | Hosein | H04N 21/43615 |
| 2016/0323863 | A1* | 11/2016 | Park | H04W 4/70 |

(Continued)

*Primary Examiner* — Rupal Dharia
*Assistant Examiner* — Adam A Cooney
(74) *Attorney, Agent, or Firm* — Kunzler Bean & Adamson (57) ABSTRACT

Apparatuses, methods, systems, and program products are disclosed for casting content based on device capabilities. An apparatus includes a processor and a memory that stores code executable by the processor. The code is executable by the processor to receive a request to cast content from a first device to a second device, determine capabilities for one or more second devices that are communicatively coupled to the first device over a data network, and select a second device of the one or more second devices to cast the content to based on the content to be casted and the capabilities of the second device.

20 Claims, 5 Drawing Sheets

(56) References Cited

U.S. PATENT DOCUMENTS

| | | | | |
|---|---|---|---|---|
| 2017/0111403 A1* | 4/2017 | Veeramani | ............. | H04L 69/24 |
| 2017/0208364 A1* | 7/2017 | Glazier | ............. | H04N 21/4432 |
| 2017/0289614 A1* | 10/2017 | VanBlon | ......... | H04N 21/42201 |
| 2017/0329572 A1* | 11/2017 | Shah | ................ | H04N 21/42203 |
| 2018/0241609 A1* | 8/2018 | Rombakh | ............... | H04L 67/28 |
| 2019/0182300 A1* | 6/2019 | Simotas | ................. | H04L 67/16 |
| 2019/0320219 A1* | 10/2019 | Yoden | .................. | G06F 3/0486 |

* cited by examiner

CASTING CONTENT BASED ON DEVICE CAPABILITIES

FIELD

The subject matter disclosed herein relates to casting content and more particularly relates to casting content based on device capabilities.

BACKGROUND

Electronic devices may have different specifications and configurations that define the capabilities of the devices. For instance, certain devices may not be able to play videos that have a certain format, resolution, sound quality, etc. based on the configurations of the devices—hardware and software. Accordingly, determining a device to share content to from a list of available devices does not provide a user with information about the capabilities of the devices, so the user does not know if a selected device is capable to play the content that is being shared.

BRIEF SUMMARY

Apparatuses, methods, systems, and program products are disclosed for casting content based on device capabilities. An apparatus, in one embodiment, includes a processor and a memory that stores code executable by the processor. In certain embodiments, the code is executable by the processor to receive a request to cast content from a first device to a second device, determine capabilities for one or more second devices that are communicatively coupled to the first device over a data network, and select a second device of the one or more second devices to cast the content to based on the content to be casted and the capabilities of the second device.

A method for casting content based on device capabilities, in one embodiment, includes receiving, by a processor, a request to cast content from a first device to a second device, determining capabilities for one or more second devices that are communicatively coupled to the first device over a data network, and selecting a second device of the one or more second devices to cast the content to based on the content to be casted and the capabilities of the second device.

A computer program product for casting content based on device capabilities, in one embodiment, includes a computer readable storage medium having program instructions embodied therewith. In certain embodiments, the program instructions are executable by a processor to cause the processor to receive a request to cast content from a first device to a second device, determine capabilities for one or more second devices that are communicatively coupled to the first device over a data network, and select a second device of the one or more second devices to cast the content to based on the content to be casted and the capabilities of the second device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus, in one embodiment, includes a processor and a memory that stores code executable by the processor. In certain embodiments, the code is executable by the processor to receive a request to cast content from a first device to a second device, determine capabilities for one or more second devices that are communicatively coupled to the first device over a data network, and select a second device of the one or more second devices to cast the content to based on the content to be casted and the capabilities of the second device.

In one embodiment, the request to cast content comprises one or more specified capability parameters of the capabilities of the one or more second devices. In certain embodiments, the code is executable by the processor to automatically define the specific capability parameters based on characteristics of the content that is being played on the first device.

In one embodiment, the code is executable by the processor to determine a best match second device to cast the content to based on the specified capability parameters and the capabilities of the one or more second devices. In some embodiments, the code is executable by the processor to present, on the first device, a list of the one or more second devices that are available to cast the content to. The second devices in the list may be presented in an order of best match for the content.

In one embodiment, the code is executable by the processor to present the capabilities of a second device in the list in response to a selection of a second device. In some embodiments, the code is executable by the processor to filter the list of second devices based on one or more specified capability parameters matching the capabilities of a second device.

In various embodiments, the code is executable by the processor to suggest one or more second devices to cast the content to based on characteristics of the content and the capabilities of the second devices prior to receiving a request to cast the content. In certain embodiments, the code is executable by the processor to detect a second device connect to a data network that the first device is connected to, request capability information for the second device, and suggest casting the content that is playing on the first device to the second device in response to the capabilities of the second device matching characteristics of the content.

In one embodiment, the code is executable by the processor to automatically cast the content to the selected second device. In some embodiments, the code is executable by the processor to automatically cast the content to the selected second device in response to determining that the selected second device has previously been used to cast content to from the first device. In various embodiments, the code is executable by the processor to automatically cast the content to the selected second device in response to determining that the selected second device is the only second device that has capabilities for playing the content.

In one embodiment, the code is executable by the processor to prompt the user to cast the content to the selected second device prior to casting the content to the selected second device. In some embodiments, the capabilities of a second device comprises information related to processors, memory, graphics, networking, input devices, input ports, externally connected devices, sensors, displays, audio, and cameras of the second device.

A method for casting content based on device capabilities, in one embodiment, includes receiving, by a processor, a request to cast content from a first device to a second device, determining capabilities for one or more second devices that are communicatively coupled to the first device over a data network, and selecting a second device of the one or more second devices to cast the content to based on the content to be casted and the capabilities of the second device.

In one embodiment, the request to cast content comprises one or more specified capability parameters of the capabilities of the one or more second devices. In further embodiments, the method includes presenting, on the first device, a list of the one or more second devices that are available to cast the content to. The second devices in the list may be presented in an order of best match for the content.

In one embodiment, the method includes suggesting one or more second devices to cast the content to based on characteristics of the content and the capabilities of the second devices prior to receiving a request to cast the content. In various embodiments, the method includes automatically casting the content to the selected second device in response to determining that the selected second device has previously been used to cast content to from the first device.

A computer program product for casting content based on device capabilities, in one embodiment, includes a computer readable storage medium having program instructions embodied therewith. In certain embodiments, the program instructions are executable by a processor to cause the processor to receive a request to cast content from a first device to a second device, determine capabilities for one or more second devices that are communicatively coupled to the first device over a data network, and select a second device of the one or more second devices to cast the content to based on the content to be casted and the capabilities of the second device.

Figure 1:
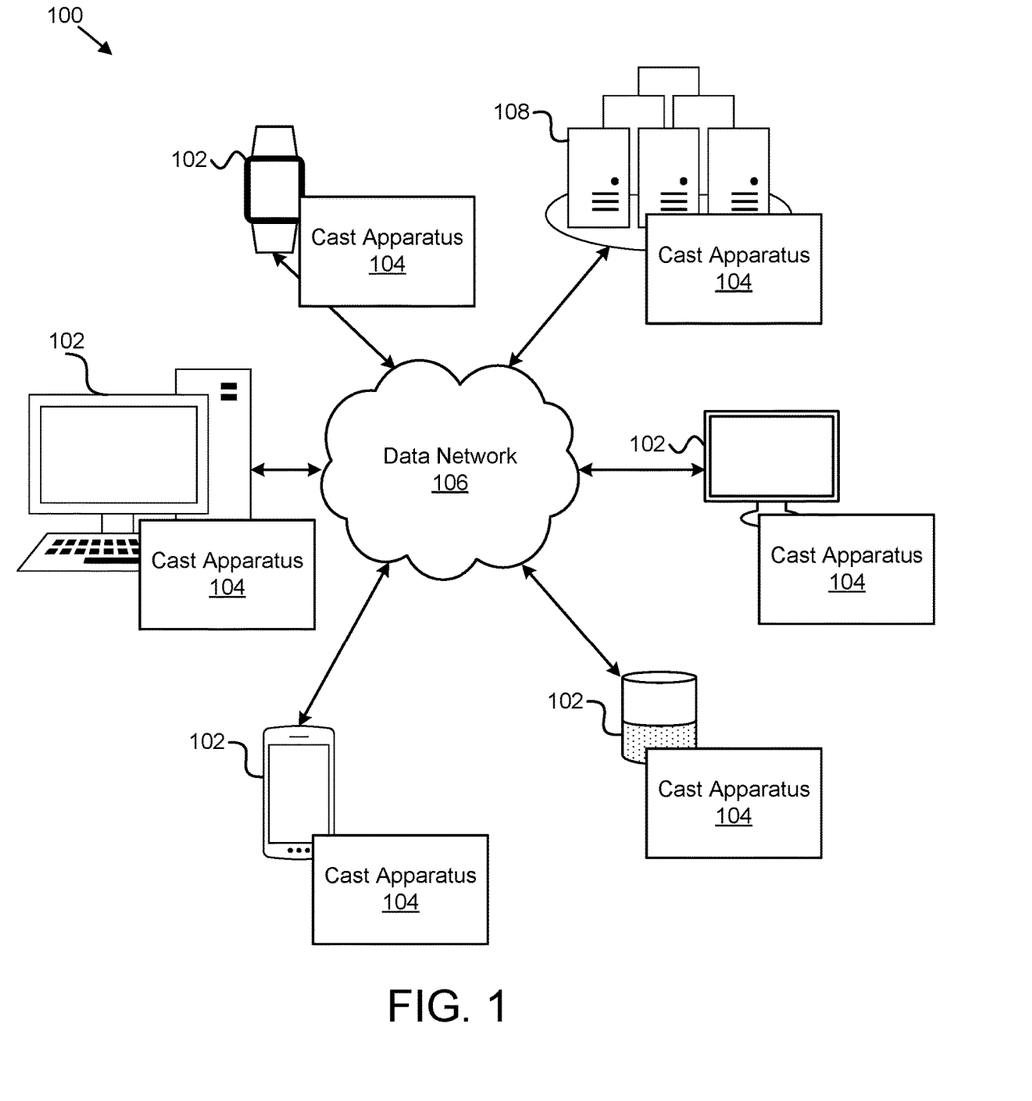
FIG. 1 is a schematic block diagram illustrating one embodiment of a system for casting content based on device capabilities.

FIG. 1 is a schematic block diagram illustrating one embodiment of a system 100 for casting content based on device capabilities. In one embodiment, the system 100 includes one or more information handling devices 102, one or more cast apparatuses 104, one or more data networks 106, and one or more servers 108. In certain embodiments, even though a specific number of information handling devices 102, cast apparatuses 104, data networks 106, and servers 108 are depicted in FIG. 1, one of skill in the art will recognize, in light of this disclosure, that any number of information handling devices 102, cast apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In one embodiment, the cast apparatus 104 is configured to receive a request to cast content from a first device to a second device. In further embodiments, the cast apparatus 104 is configured to determine capabilities for one or more second devices that are communicatively coupled to the first device over a data network. In further embodiments, the cast apparatus 104 is configured to select a second device of the one or more second devices to cast the content to based on the content to be casted and the capabilities of the second device. The cast apparatus 104, including its various sub-modules, may be located on one or more information handling devices 102 in the system 100, one or more servers 108, one or more network devices, and/or the like. The cast apparatus 104 is described in more detail below with reference to FIGS. 2 and 3.

In various embodiments, the cast apparatus 104 may be embodied as part of a smart device, a network device, an Internet of Things device, a computing device, or as a hardware appliance that can be installed or deployed on an information handling device 102, on a server 108, on a user's mobile device, on a display, or elsewhere on the data network 106. In certain embodiments, the cast apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the cast apparatus 104 may include a power interface, a wired and/or wireless network interface, a graphical interface that attaches to a display, and/or a semiconductor integrated circuit device as described below, configured to perform the functions described herein with regard to the cast apparatus 104.

The cast apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the cast apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the cast apparatus 104.

The semiconductor integrated circuit device or other hardware appliance of the cast apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the cast apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and may host, store, stream, or the like content to a different device such as videos, music, podcasts, images, games, augmented and/or virtual reality environments, and/or the like.

Figure 2:
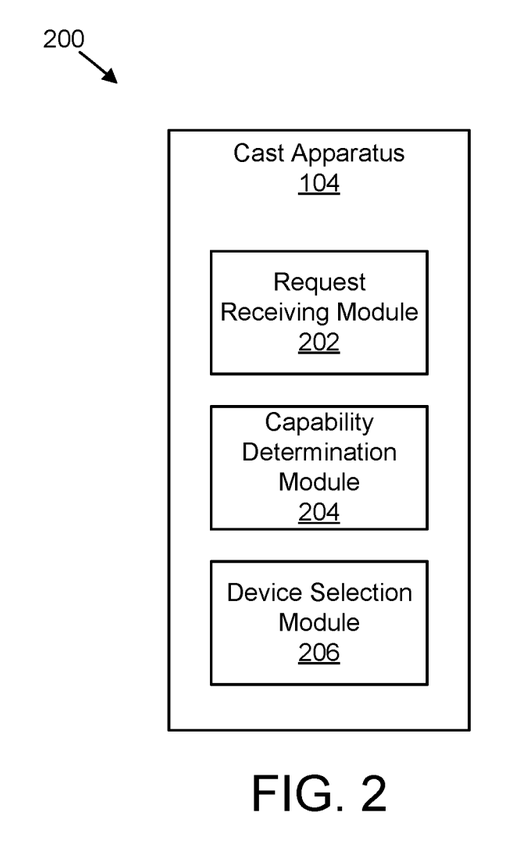
FIG. 2 is a schematic block diagram illustrating one embodiment of an apparatus for casting content based on device capabilities.

FIG. 2 is a schematic block diagram illustrating one embodiment of an apparatus 200 for casting content based on device capabilities. In one embodiment, the apparatus 200 includes an instance of a cast apparatus 104. In one embodiment, the cast apparatus 104 includes one or more of a request receiving module 202, a capability determination module 204, and a device selection module 206, which are described in more detail below.

In one embodiment, the request receiving module 202 is configured to receive a request to cast content from a first device to a second device. As used herein, casting content may refer to the ability of mobile devices or other computing devices to initiate and/or control playback of audio/video content on other devices such as other mobile devices, smart devices, Internet of Things devices, set-top boxes, gaming consoles, and/or other computing devices. For example, a user may "cast" content that is playing on their smart phone to a smart television to continue consuming the content on the smart television instead of, or in addition to, consuming the content on the smart phone. In such an embodiment, the devices may be interconnected via a data network 106 and may use casting protocols (e.g., Google Cast®) to share the content, links to the content (e.g., links to content streams and/or network locations where the content is stored), and/or the like.

In one embodiment, the request receiving module 202 receives a request to cast content from one device to a different device in response to user input. For instance, a user may select an option (e.g., a graphical button) to cast content that is being consumed to another device that is available to play the content. In such an embodiment, the request receiving module 202 may execute on the user's device to detect, receive, intercept, or the like the request to cast the content to a different device.

In one embodiment, the capability determination module 204 is configured to determine capabilities for one or more other devices that are communicatively coupled to the first device over the data network 106 in response to receiving the request to cast the content to a different device. The capability determination module 204, for instance, may query each available device on the network 106 for information describing the device's hardware (e.g., specifications for the device's processor, memory, persistent storage, graphical processing unit, network connectivity, number and types of input ports, security features (e.g., biometric, username/password, etc.), types of connected input devices (e.g., touch screen, mouse, keyboard, microphone, etc.), externally connected devices and types, sensors, audio capabilities, cameras, and/or the like); operating system (e.g., OS type, OS version, and/or the like); applications (e.g., streaming services, media players, etc.); services (printing services, video/audio services, etc.); programs (e.g., codecs, etc.); displays (e.g., number and types of displays, display size, display resolution, and/or the like); and/or the like.

In certain embodiments, instead of capturing the device capability information in real-time in response to receiving a request to cast content, the capability determination module 204 periodically audits devices that are available to cast content to on the network 106 to initially capture device capability information and then to periodically update information that has already been captured. The capability determination module 204 may store the device capability information for each device in a data store locally or at a location that is accessible via the network 106. The information may be stored in a database or other structured format, e.g., extensible markup language ("XML").

In one embodiment, the device selection module 206 is configured to select a second device of the one or more second devices to cast the content to based on the content to be casted and the capabilities of the second device. For instance, if a user is watching a movie on his smart phone 4K resolution, then the device selection module 206 may select the smart television that is capable of playing the content in at least 4K resolution. In such an embodiment, the device selection module 206 may attempt to determine a device that is a best match to cast the content to based on the content and the capabilities of the devices that are available to cast the content to.

For instance, the device selection module 206 may determine the best device that is capable of streaming video content from a streaming service based on the devices' processing power, network connectivity, display resolution and settings, and/or the like. Thus, the device selection module 206 may consider a myriad of different capabilities for each device that is available to cast content to in order to determine the best match for the content.

In certain embodiments, the device selection module 206 may weigh, rank, score, value, or the like certain capabilities as more important than other capabilities. For example, if the content that is being cast is streaming content from an Internet streaming service, then network capabilities (e.g., bandwidth, connection speed, etc.) may be ranked higher than display size. Or a 75 inch display may be weighted higher than a 40 inch display. Or a display that has 4K resolution may be weighted higher than a display that only has 1080p resolution. Or if the user is streaming audio content from a streaming service, e.g., Spotify®, then the audio output capabilities of the device (e.g., a soundbar) and/or the types of speakers that are connected to a device may be ranked higher than the graphics processing capabilities of the device. The weighting may be based on the characteristics of the content that is being cast. For example, if the content is a video that has a maximum resolution of 1080p, then the display that has 4K resolution capabilities will be weighted the same as a display that has 1080p capabilities because the video cannot be played at 4 k resolution.

In certain embodiments, the device selection module 206 determines a score, value, rank, or the like for each available device, based on match or fit between the content characteristics and the capabilities of the other devices. In one embodiment, the device selection module 206 may determine how many characteristics of the content match the capabilities of a device to determine a score for the device. For instance, if a device has ten capabilities out of twenty capabilities that match with the characteristics of the content, then the score for the device may be 50%. For example, if the content is a video, and the device has capabilities such as a graphics processor, a display that has 1080p resolution, a 50 inch display, and so on, but does not have certain capabilities such as a 70 inch display, a voice-command remote, a display with 4K resolution, or the like, then the device may be given a score accordingly.

In certain embodiments, the device selection module 206 automatically selects a device that has the best fit to cast the content to based on the score, value rank, or the like (e.g., the device with the highest score). In certain embodiments, the device selection module 206 determines whether the selected device, e.g., the device with the highest fit score has previously been used to cast content to. If so, the content is automatically cast to the selected device; otherwise, the user may be prompted to confirm casting the content to the selected device (see below). Thus, one device may be a better fit to cast a video to than to cast music to, which the capability determination module 204 determines based on the content characteristics and the device capabilities.

The device selection module 206 may search, parse, process, and/or the like the capabilities of each of the devices that are available to cast content to. For instance, the device selection module 206 may cross reference characteristics of the content (e.g., content type, file extension, video resolution, audio quality, or the like) with the capabilities of the other devices that are available to cast the content to using the information that the capability determination module 204 captured to determine which of the other devices are a good fit or match to cast the content to.

In further embodiments, the device selection module 206 selects the device in response to determining that the device is the only device that has capabilities for playing the content or is otherwise the only device that is available. In such an embodiment, the content may be automatically cast to the selected device.

In one embodiment, the request to cast content may include one or more specified capability parameters of the capabilities of the one or more second devices. For instance, a user may specify certain parameters such as a minimum display resolution or size, a minimum processor speed, a minimum network bandwidth, a number of input ports, that the device has a camera, that the device is at a certain location, and/or the like. In such an embodiment, the device selection module 206 may choose a device that meets all or most of the requested features/capabilities. In this manner, the user can filter devices that the content can be cast to by specified capability parameters.

In the event that none of the devices have certain requested parameters, the device selection module 206 may attempt to determine the next best capability. For example, if 4K video resolution is requested, but none of the available devices have 4K capabilities, then devices that can play video at 1080p resolution may be selected.

In some embodiments, the device selection module 206 automatically defines the specific capability parameters based on characteristics of the content that is being played on the first device. For instance, if a video is currently being played at 4K resolution, then devices that are capable of playing videos in 4K resolution may be selected to cast the content to.

In certain embodiments, the capability determine module 204 may also determine the location of the devices within a home, office, building, or the like and the location of the devices relative to the device that is casting the content. Accordingly, the device selection module 206 may select a device that is within the same location as the casting device, e.g., the same room, or within a distance or proximity of the casting device, e.g., a television in the theatre room when the casting device is in the kitchen. The device selection module 206 may automatically select a device that is closest to the user's device and/or list available devices in order of proximity to the user's device, as described in more detail below.

In this manner, the cast apparatus 104 can determine and provide the capabilities of various devices that content can be casted to, which may provide a better casting experience than if the user were to just select a device based solely on the device's name, location, or the like without having additional capability information to make a more informed casting decision. Furthermore, in certain embodiments, the cast apparatus 104 may automatically select the best available device to cast the content to based on the device's capabilities and the characteristics of the content such that the user does not have to manually determine and select a device to cast the content to.

Figure 3:
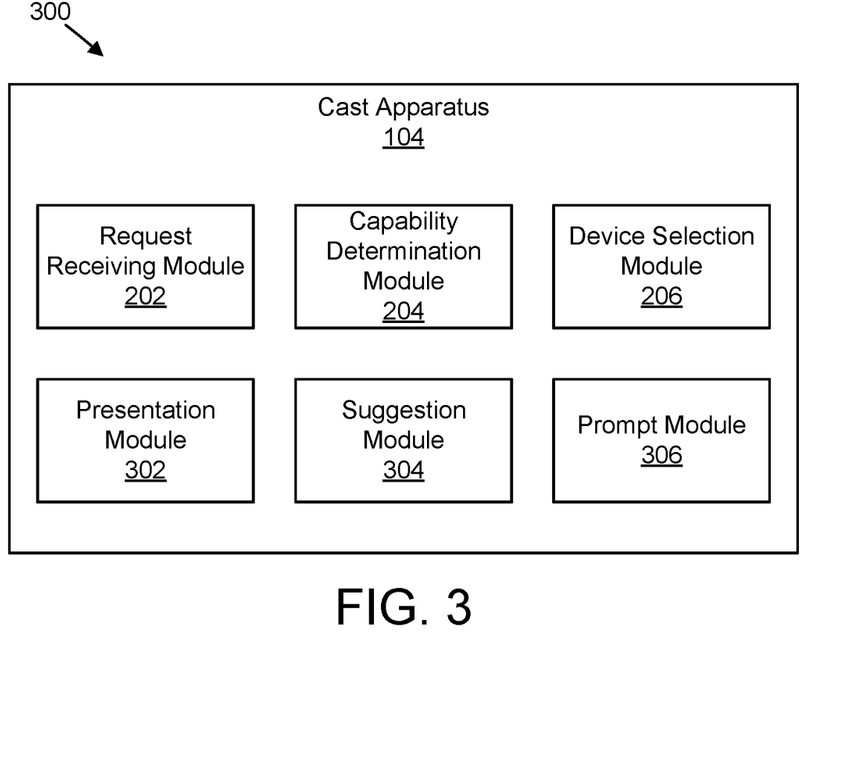
FIG. 3 is a schematic block diagram illustrating one embodiment of another apparatus for casting content based on device capabilities.

FIG. 3 is a schematic block diagram illustrating one embodiment of another apparatus 300 for casting content based on device capabilities. In one embodiment, the apparatus 300 includes an instance of a cast apparatus 104. The cast apparatus 104, in certain embodiments, includes a request receiving module 202, a capability determination module 204, and a device selection module 206, which may be substantially similar to the request receiving module 202, the capability determination module 204, and the device selection module 206 described above with reference to FIG. 2. The cast apparatus 104, in further embodiments, includes one or more of a presentation module 302, a suggestion module 304, and a prompt module 306, which are described in more detail below.

In one embodiment, the presentation module 302 is configured to present, on the first device, a list of the one or more second devices that are available to cast the content to. In certain embodiments, the presentation module 302 presents the devices in the list in an order of best match for the content, which may be determined based on the characteristics of the content and the capabilities of the devices, as described above.

For instance, instead of presenting a flat list of device names, as in conventional systems, the presentation module 302 receives or determines the score, rank, rating, or the like for each device that the capability determination module 204 determines and orders the list of devices that are available to cast the content to based on the determined score, rank, rating, etc. for each device. In certain embodiments, the presentation module 302 shows the score, rank, rating, or the like for each device in the list as a number, a ranking (e.g., 3 out of 5 starts), as a color (e.g., green indicating a good match, red indicating a poor match), as a percentage (e.g., a device is a 80% match for this content), and/or the like.

In one embodiment, the presentation module 302 may receive a selection of a device in the presented list and display or present the capability details for the selected device, e.g., the device name, location, processor type and speed, memory, display size and resolution, connected external devices, number and types of input ports, input devices, network connection type and strength/reliability/bandwidth, operating system type and version, installed applications, and so on so that the user can see what the capabilities of a device are before selecting a device to cast the content to.

In certain embodiments, the presentation module 302 filters the list to only show devices that have one or more specified capability parameters. For instance, the user may enter a specific location, a display resolution, an amount of free memory, a particular operating system or application, or the like for the device that the user wants to cast the content to. Based on the specified parameters, the presentation module 302 hides devices from the list that do not have the specified capabilities so that only devices that meet at least one or all of the specified parameters are shown in the list.

In one embodiment, the suggestion module 304 is configured to suggest one or more devices to cast the content to based on characteristics of the content and the capabilities of the devices prior to receiving a request to cast the content, e.g., based on the match score that the capability determination module 204 determines. In some embodiments, the suggestion module 304 may detect a new device that connects to a data network that the user's device is connected to and may request the capability information for the new device (e.g., via the capability determination module 204). Based on the capability information and the characteristics of the content playing on the first device, the suggestion module 304 may present a suggestion or prompt to cast the content to the new device if the new device is a good match for presenting the content, e.g., has a match score that satisfies a threshold score.

In certain embodiments, the suggestion module 304 detects when the user selects a device to cast the content to and determines whether there is a different device that may be a better match for casting the content to. If so, the suggestion module 304 may present a notification or prompt to the user to suggest casting the content to the different device instead of the device that was selected. The notification may include reasons why the different device may be a better match, including the capabilities of the different device that may be better suited for the content that is being presented on the user's device.

In one embodiment, the prompt module 306 is configured to prompt the user to cast the content to the selected second device prior to casting the content to the selected second device. For instance, the prompt module 306 may prompt the user to confirm casting to a device that the device selection module 206 automatically selects. If the user rejects casting the content to the selected device, the presentation module 302 may present the list of devices that are available to cast the content to. Otherwise, the content may be cast to the selected device in response to the user confirming casting the content to the selected device.

Figure 4:
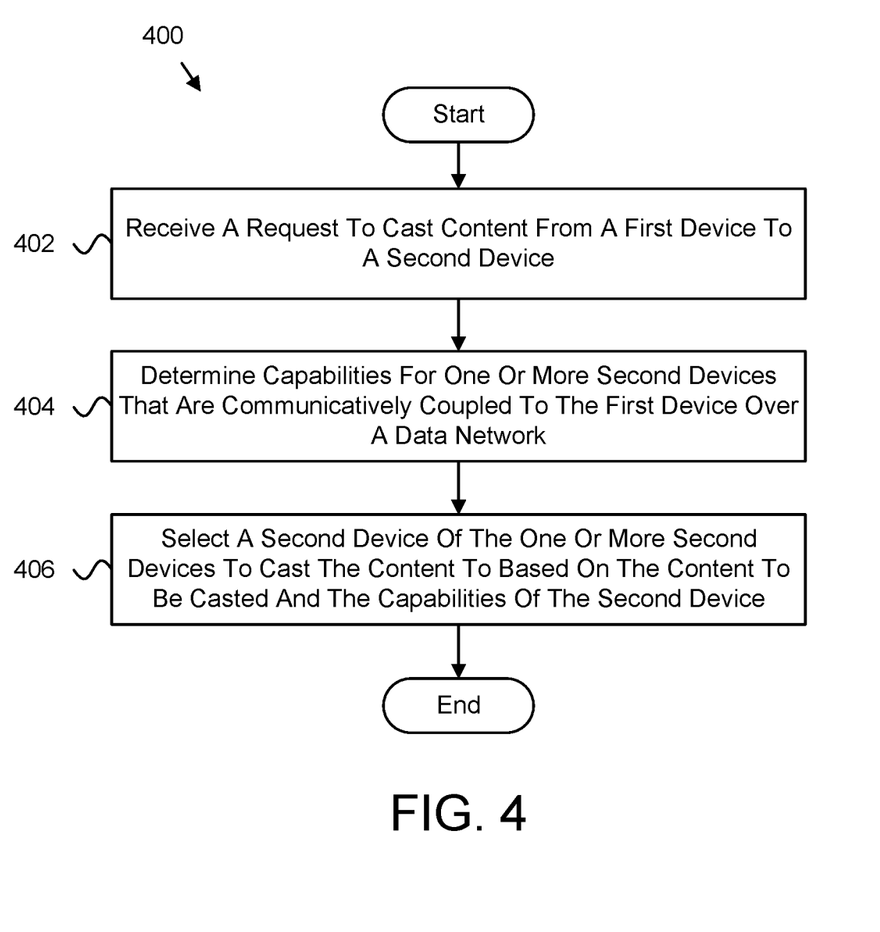
FIG. 4 is a schematic flow chart diagram illustrating one embodiment of a method for casting content based on device capabilities.

FIG. 4 is a schematic flow chart diagram illustrating one embodiment of a method 400 for casting content based on device capabilities. In one embodiment, the method 400 begins and receives 402 a request to cast content from a first device to a second device. In further embodiments, the method 400 determines 404 capabilities for one or more second devices that are communicatively coupled to the first device over a data network. In certain embodiments, the method 400 selects 406 a second device of the one or more second devices to cast the content to based on the content to be casted and the capabilities of the second device, and the method 400 ends. In one embodiment, the request receiving module 202, the capability determination module 204, and the device selection module 206 perform the various steps of the method 400.

Figure 5:
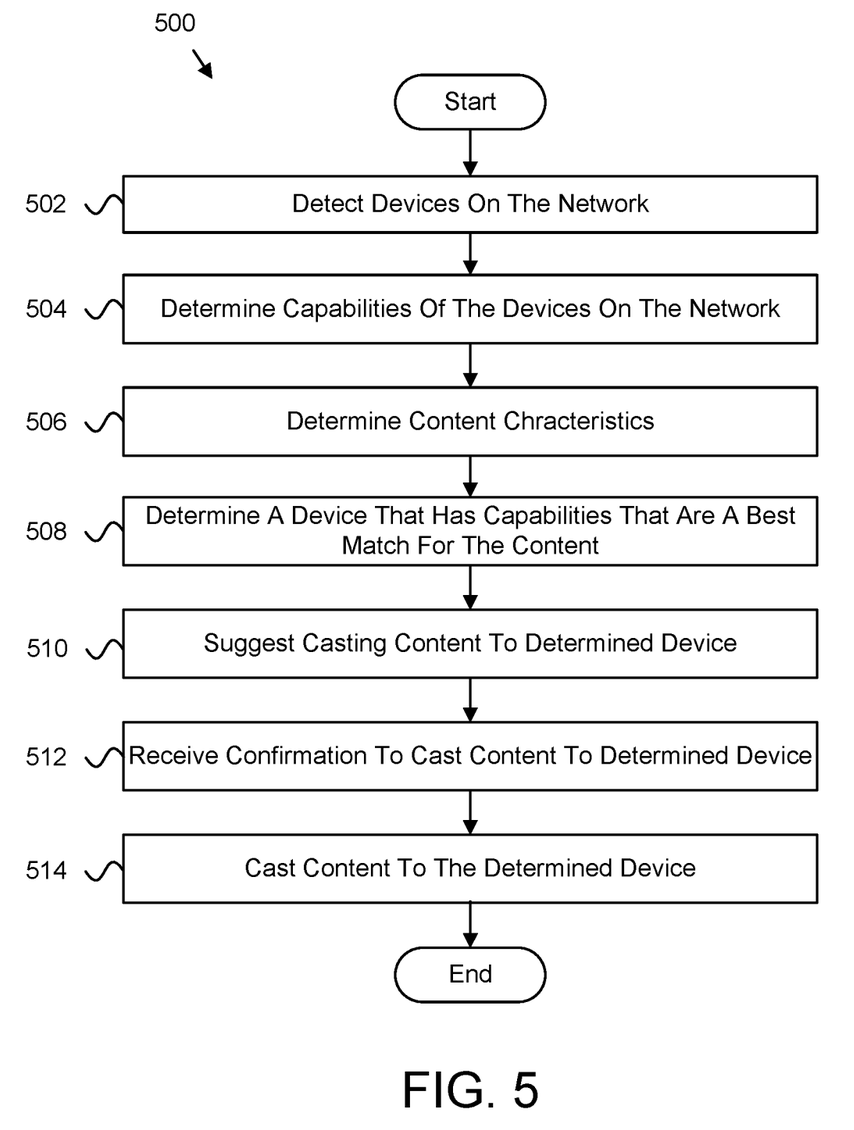
FIG. 5 is a schematic flow chart diagram illustrating one embodiment of another method for casting content based on device capabilities.

FIG. 5 is a schematic flow chart diagram illustrating one embodiment of another method 500 for casting content based on device capabilities. In one embodiment, the method 500 begins 502 and detects one or more devices that are connected to the user's device via a data network 106. In some embodiments, the method 500 determines 504 the capabilities of the detected devices on the data network 106 and determines 506 characteristics of the content that is being presented on the user's device.

In one embodiment, the method 500 determines 508 a device that has capabilities that are a best match for the content based on the content characteristics. In such an embodiment, a fit score may be determined or calculated such that the available devices can be compared against one another to determine which device is a better match for the content.

In certain embodiments, the method 500 suggests 510 casting the content to the determined device. In such an embodiment, the method 500 receives 512 confirmation from the user to cast the content to the determined device, and casts 514 the content to the determined device over the data network 106, and the method 500 ends. In one embodiment, the request receiving module 202, the capability determination module 204, the device selection module 206, the suggestion module 304, and the prompt module 306 perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory that stores code executable by the processor to:
receive a request to cast content on a first device from the first device to a second device;
determine a type of media for the content on the first device;
determine one or more capabilities for one or more devices that are communicatively coupled to the first device over a data network, the one or more capabilities corresponding to the type of media for the content;
filter the one or more devices based on the one or more capabilities corresponding to the type of media for the content to generate, on the first device, a list of one or more second devices including the one or more capabilities corresponding to the type of media for the content that are available to cast the content to from the first device;
filter the generated list of second devices based on one or more user-specified capability parameters for the type of media for the content matching one or more capabilities in the one or more second devices corresponding to the type of media for the content; and
in response to at least one of the second devices in the list of second devices including the one or more capabilities corresponding to the type of media for the content that match the user-specified capability parameters for the type of media for the content:
present, on the first device, each of the second devices in the list of second devices including the one or more capabilities corresponding to the type of media for the content that match the user-specified capability parameters for the type of media for the content, and
receive a selection from the list of second devices including the one or more capabilities corresponding to the type of media for the content that match the user-specified capability parameters for the type of media for the content to cast the content from the first device.

2. The apparatus of claim 1, wherein the request to cast content comprises one or more specified capability parameters of the capabilities of the one or more second devices.

3. The apparatus of claim 2, wherein the code is executable by the processor to automatically define the specific capability parameters based on characteristics of the content that is being played on the first device.

4. The apparatus of claim 2, wherein the code is executable by the processor to determine a best match second device to cast the content to based on the specified capability parameters and the capabilities of the one or more second devices.

5. The apparatus of claim 1, wherein the second devices in the list of second devices are presented in an order of best match for the content.

6. The apparatus of claim 5, wherein the code is executable by the processor to present the capabilities of a second device in the list of second devices in response to a selection of a second device.

7. The apparatus of claim 1, wherein the code is executable by the processor to suggest one or more second devices to cast the content to based on characteristics of the content and the capabilities of the second devices prior to receiving a request to cast the content.

8. The apparatus of claim 7, wherein the code is executable by the processor to:
  detect a second device connected to the data network that the first device is connected to;
  request capability information for the second device; and
  suggest casting the content that is playing on the first device to the second device in response to the capabilities of the second device matching characteristics of the content.

9. The apparatus of claim 1, wherein the code is executable by the processor to automatically cast the content to the selected second device.

10. The apparatus of claim 9, wherein the code is executable by the processor to automatically cast the content to the selected second device in response to determining that the selected second device has previously been used to cast content to from the first device.

11. The apparatus of claim 9, wherein the code is executable by the processor to automatically cast the content to the selected second device in response to determining that the selected second device is the only second device that includes capabilities for playing the content.

12. The apparatus of claim 1, wherein the code is executable by the processor to prompt the user to cast the content to the selected second device prior to casting the content to the selected second device.

13. The apparatus of claim 1, wherein the capabilities of a second device comprises information related to processors, memory, graphics, networking, input devices, input ports, externally connected devices, sensors, displays, audio, and cameras of the second device.

14. A method, comprising:
  receiving, by a processor, a request to cast content on a first device from the first device to a second device;
  determining a type of media for the content on the first device;
  determining one or more capabilities for one or more devices that are communicatively coupled to the first device over a data network, the one or more capabilities corresponding to the type of media for the content;
  filtering the one or more devices based on the one or more capabilities corresponding to the type of media for the content to generate, on the first device, a list of one or more second devices including the one or more capabilities corresponding to the type of media for the content that are available to cast the content to from the first device;
  filtering the generated list of second devices based on one or more user-specified capability parameters for the type of media for the content matching one or more capabilities in the one or more second devices corresponding to the type of media for the content; and
  in response to at least one of the second devices in the list of second devices including the one or more capabilities corresponding to the type of media for the content that match the user-specified capability parameters for the type of media for the content:
    presenting, on the first device, each of the second devices in the list of second devices including the one or more capabilities corresponding to the type of media for the content that match the user-specified capability parameters for the type of media for the content, and
    receiving a selection from the list of second devices including the one or more capabilities corresponding to the type of media for the content that match the user-specified capability parameters for the type of media for the content to cast the content from the first device.

15. The method of claim 14, wherein the request to cast content comprises one or more specified capability parameters of the capabilities of the one or more second devices.

16. The method of claim 14, wherein the second devices in the list of second devices are presented in an order of best match for the content.

17. The method of claim 14, further comprising suggesting one or more second devices to cast the content to based on characteristics of the content and the capabilities of the second devices prior to receiving a request to cast the content.

18. The method of claim 14, further comprising automatically casting the content to the selected second device in response to determining that the selected second device has previously been used to cast content to from the first device.

19. A computer program product, comprising a non-transitory computer-readable storage medium including program instructions embodied therewith, the program instructions executable by a processor to cause the processor to:
  receive a request to cast content on a first device from the first device to a second device;
  determine a type of media for the content on the first device;
  determine one or more capabilities for one or more devices that are communicatively coupled to the first device over a data network, the one or more capabilities corresponding to the type of media for the content;
  filter the one or more devices based on the one or more capabilities corresponding to the type of media for the content to generate, on the first device, a list of one or more second devices including the one or more capabilities corresponding to the type of media for the content that are available to cast the content to from the first device;
  filter the generated list of second devices based on one or more user-specified capability parameters for the type of media for the content matching one or more capabilities in the one or more second devices corresponding to the type of media for the content;
  in response to none of the second devices in the list of second devices including the one or more capabilities corresponding to the type of media for the content that match the user-specified capability parameters, determine at least one second device that comprises next best capabilities as it relates to the user-specified capability parameters for the type of media for the content:
    determine at least one device in the one or more devices that is communicatively coupled to the first device over the data network that comprises one or more next best capabilities relating to the user-specified capability parameters for the type of media for the content, and select the at least one device that is communicatively coupled to the first device over the data network and comprises the one or more next best capabilities; and in response to at least one of the second devices in the list of second devices including the one or more capabilities corresponding to the type of media for the content that match the user-specified capability parameters for the type of media for the content:

present, on the first device, each of the second devices in the list of second devices including the one or more capabilities corresponding to the type of media for the content that match the user-specified capability parameters for the type of media for the content, and receive a selection from the list of second devices including the one or more capabilities corresponding to the type of media for the content that match the user-specified capability parameters for the type of media for the content to cast the content from the first device.

20. The apparatus of claim 1, wherein the user-specified capability parameters comprise at least one of a location, a display resolution, an amount of free memory, an operating system, and an application.

\* \* \* \* \*